(12) United States Patent
Chen et al.

(10) Patent No.: US 11,514,034 B2
(45) Date of Patent: Nov. 29, 2022

(54) CONVERSION OF NATURAL LANGUAGE QUERY

(71) Applicant: Microsoft Technology Licensing, LLC, Redmond, WA (US)

(72) Inventors: Bei Chen, Redmond, WA (US); Jian-Guang Lou, Redmond, WA (US); Yan Gao, Redmond, WA (US); Dongmei Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/417,559

(22) PCT Filed: Dec. 10, 2019

(86) PCT No.: PCT/US2019/065314
§ 371 (c)(1),
(2) Date: Jun. 23, 2021

(87) PCT Pub. No.: WO2020/149959
PCT Pub. Date: Jul. 23, 2020

(65) Prior Publication Data
US 2022/0058191 A1    Feb. 24, 2022

(30) Foreign Application Priority Data

Jan. 18, 2019 (CN) .......................... 201910108419.1

(51) Int. Cl.
*G06F 16/242* (2019.01)
*G06F 16/2452* (2019.01)
(Continued)

(52) U.S. Cl.
CPC .... *G06F 16/2425* (2019.01); *G06F 16/24522* (2019.01); *G06F 16/24564* (2019.01); *G06F 16/3344* (2019.01)

(58) Field of Classification Search
CPC .................................................. G06F 16/2425
See application file for complete search history.

(56) References Cited

U.S. PATENT DOCUMENTS

2015/0261744 A1   9/2015  Suenbuel et al.
2017/0357635 A1*  12/2017 Mohaideen P ..... G06F 16/9535
2021/0117625 A1   4/2021  Gao et al.

OTHER PUBLICATIONS

Andreas, et al., "Semantic Parsing as Machine Translation", In Proceedings of the 51st Annual Meeting of the Assocation for Computational Linguistics, Aug. 4, 2013, pp. 47-52.

(Continued)

*Primary Examiner* — Van H Oberly
(74) *Attorney, Agent, or Firm* — Schwegman Lundberg & Woessner, P.A.

(57) ABSTRACT

In accordance with implementations of the present disclosure, a solution for converting a natural language query is provided. In this solution, a first natural language query and a second natural language query for one or more data tables are received, wherein semantics of the second natural language query is dependent on the first natural language query. A third natural language query for one or more data tables is generated based on the first natural language query and the second natural language query, wherein semantics of the third natural language query is identical to the semantics of the second natural language query and independent of the first natural language query. In this way, this solution can convert a context-dependent natural language query into a context-independent natural language query, thereby enabling interfacing with any semantic parsers which can convert a natural language query into a computer-executable query.

13 Claims, 7 Drawing Sheets

(51) Int. Cl.
G06F 16/33 (2019.01)
G06F 16/2455 (2019.01)

(56) References Cited

OTHER PUBLICATIONS

Bahdanau, et al., "Neural Machine Translation by Jointly Learning to Align and Translate", In Journal of Computing Research Repository, Sep. 1, 2014, 15 Pages.
Berant, et al., "Semantic Parsing on Freebase from Question-Answer Pairs", In Proceedings of Conference on Empirical Methods in Natural Language Processing, vol. 2, Issue 6, Oct. 18, 2013, pp. 1533-1544.
Bertomeu, et al., "Contextual Phenomena and Thematic Relations in Database QA Dialogues: Results from a Wizard-of-Oz Experiment", In Proceedings of the Interactive Question Answering Workshop at HLT-NAACL, Jun. 2006, pp. 1-8.
Chen, et al., "Learning to Interpret Natural Language Navigation Instructions from Observations", In Proceedings of the Twenty-Fifth AAAI Conference on Artificial Intelligence, Aug. 4, 2011, pp. 859-865.
Cheng, et al., "Learning Structured Natural Language Representations for Semantic Parsing", In Proceedings of the 55th Annual Meeting of the Association for Computational Linguistics, Jul. 30, 2017, pp. 44-55.
Chomsky, Noam, "Syntactic Structures", Published by De Gruyter Mouton, Second Edition, 2002, 68 Pages.
Clark, et al., "Improving Coreference Resolution by Learning Entity-Level Distributed Representations", In Proceedings of the 54th Annual Meeting of the Association for Computational Linguistics, vol. 1, Aug. 7, 2016, pp. 643-653.
Dahl, et al., "Expanding the Scope of the Atis Task: The Atis-3 corpus", In Proceedings of the workshop on Human Language Technology, Mar. 8, 1994, pp. 43-48.
Desai, et al., "Program Synthesis using Natural Language", In Proceedings of 38th International Conference on Software Engineering, May 14, 2016, pp. 345-356.
Dhamdhere, et al., "Analyza: Exploring Data with Conversation", In Proceedings of the 22nd International Conference on Intelligent User Interfaces, Mar. 13, 2017, pp. 493-504.
Dong, et al., "Coarse-to-Fine Decoding for Neural Semantic Parsing", In Proceedings of the 56th Annual Meeting of the Association for Computational Linguistics, vol. 1, Jul. 15, 2018, pp. 731-742.
Dong, et al., "Language to Logical Form with Neural Attention", In Proceedings of the 54th Annual Meeting of the Association for Computational Linguistics, Aug. 7, 2016, pp. 33-43.
Durrett, et al., "Neural CRF Parsing", In Proceedings of the 53rd Annual Meeting of the Association for Computational Linguistics and the 7th International Joint Conference on Natural Language Processing, Jul. 26, 2015, pp. 302-312.
Fader, et al., "Open Question Answering over Curated and Extracted Knowledge Bases", In Proceedings of the 20th ACM SIGKDD International Conference on Knowledge Discovery and Data Mining, Aug. 24, 2014, pp. 1156-1165.
Gao, et al., "A Hybrid Semantic Parsing Approach for Tabular Data Analysis", In Repository of arXiv: 1910.10363, Oct. 23, 2019, 09 Pages.
Gao, et al., "DataTone: Managing Ambiguity in Natural Language interfaces for Data Visualization", In Proceedings of the 28th Annual ACM Symposium on User Interface Software and Technology, Nov. 8, 2015, pp. 489-500.
Gaspers, et al., "Learning a Semantic Parser from Spoken Utterances", In Proceedings of the IEEE International Conference on Acoustics, Speech and Signal Processing, May 4, 2014, pp. 3201-3205.
Gu, et al., "Incorporating Copying Mechanism in Sequence-to-Sequence Learning", In Proceedings of the 54th Annual Meeting of the Association for Computational Linguistics, vol. 1, Aug. 7, 2016, pp. 1631-1640.

Gulawani, et al., "NLyze: Interactive Programming by Natural Language for Spreadsheet Data Analysis and Manipulation", In Proceedings of the ACM SIGMOD International Conference on Management of Data, Jun. 22, 2014, pp. 803-814.
Hall, et al., "Less Grammar, More Features", In Proceedings of the 52nd Annual Meeting of the Association for Computational Linguistics, Jun. 23, 2014, pp. 228-237.
Hoque, et al., "Applying Pragmatics Principles for Interaction with Visual Analytics", In IEEE Transactions on Visualization and Computer Graphics, vol. 24, issue 1, Jan. 2018, pp. 309-318.
Huang, et al., "Bidirectional LSTM-CRF Models for Sequence Tagging", In Journal of the Computing Research Repository, Aug. 9, 2015, 10 Pages.
Iyer, et al., "Learning a Neural Semantic Parser from User Feedback", In Proceedings of Annual Meeting of the Association for Computational Linguistics, Jul. 30, 2017, pp. 963-973.
Iyyer, et al., "Search-based Neural Structured Learning for Sequential Question Answering", In Proceedings of the 55th Annual Meeting of the Association for Computational Linguistics, Jul. 30, 2017, pp. 1821-1831.
Jia, et al., "Data Recombination for Neural Semantic Parsing", In Proceedings of the 54th Annual Meeting of the Association for Computational Linguistics, Aug. 7, 2016, pp. 12-22.
Kate, et al., "Using String-Kernels for Learning Semantic Parsers", In Proceedings of the 21st International Conference on Computational Linguistics and 44th Annual Meeting of the AC, Jul. 2006, pp. 913-920.
Krishnamurthy, et al., "Jointly Learning to Parse and Perceive: Connecting Natural Language to the Physical World", In Journal of Transactions of the Association for Computational Linguistics, vol. 1, May 2013, pp. 193-206.
Krishnamurthy, et al., "Neural Semantic Parsing with Type Constraints for Semi-Structured Tables", In Proceedings of the Conference on Empirical Methods in Natural Language Processing, Sep. 7, 2017, pp. 1516-1526.
Kumar, et al., "Incomplete Follow-up Question Resolution using Retrieval based Sequence to Sequence Learning", In Proceedings of the 40th International ACM SIGIR Conference on Research and Development in Information Retrieval, Aug. 7, 2017, pp. 705-714.
Kumar, et al., "Non-sentential Question Resolution using Sequence to Sequence Learning", In Proceedings of the 26th International Conference on Computational Linguistics: Technical Papers, Dec. 11, 2016, pp. 2022-2031.
Kushman, et al., "Using Semantic Unification to Generate Regular Expressions from Natural Language", In Proceedings of the Conference of the North American Chapter of the Association for Computational Linguistics Human Language Technologies, Jun. 9, 2013, pp. 826-833.
Kwiatkowski, et al., "Inducing Probabilistic CCG Grammars from Logical Form with Higher-Order Unification", In Proceedings of the Conference on Empirical Methods in Natural Language Processing, Oct. 9, 2010, pp. 1223-1233.
Kwiatkowski, et al., "Lexical Generalization in CCG Grammar Induction for Semantic Parsing", In Proceedings of the Conference on Empirical Methods in Natural Language Processing, Jul. 27, 2011, pp. 1512-1523.
Lee, et al., "End-to-end Neural Coreference Resolution", In Proceedings of the Conference on Empirical Methods in Natural Language Processing, Sep. 7, 2017, pp. 188-197.
Li, et al., "NaLIR: An Interactive Natural Language Interface for Querying Relational Databases", In Proceedings of the ACM SIGMOD International Conference on Management of Data, Jun. 22, 2014, pp. 709-712.
Li, et al., "Understanding Natural Language Queries over Relational Databases", In Journal of ACM SIGMOD Record, vol. 45, Issue 1, Mar. 2016, pp. 6-13.
Liang, Percy, "Lambda Dependency-Based Compositional Semantics", In Journal of Computing Research Repository, Sep. 17, 2013, 06 Pages.
Liang, et al., "Learning Dependency-Based Compositional Semantics", In Journal of Computational Linguistics, vol. 39, Issue 2, May 2, 2013, pp. 389-446.

(56) References Cited

OTHER PUBLICATIONS

Liang, Percy, "Learning Executable Semantic Parsers for Natural Language Understanding", In Journal of Communications of the ACM, vol. 59, No. 9, Sep. 2016, pp. 68-76.
Liu, et al., "FANDA: A Novel Approach to Perform Follow-Up Query Analysis", In Proceedings of the Thirty-Third AAAI Conference on Artificial Intelligence, Jul. 17, 2019, pp. 6770-6777.
Long, et al., "Simpler Context-Dependent Logical Forms via Model Projections", In Proceedings of the 54th Annual Meeting of the Association for Computational Linguistics, Aug. 7, 2016, pp. 1456-1465.
Lu, Wei, "Semantic Parsing with Relaxed Hybrid Trees", In Proceedings of the Conference on Empirical Methods in Natural Language Processing, Oct. 25, 2014, pp. 1308-1318.
Miller,, et al.. "A Fully Statistical Approach to Natural Language Interfaces", In Proceedings of the 34th Annual Meeting on Association for Computational Linguistics, Jun. 24, 1996, pp. 55-61.
Palakurthi, et al., "Classification of Attributes in a Natural Language Query into Different SQL Clauses", In Proceedings of the International Conference Recent Advances in Natural Language Processing, Sep. 7, 2015, pp. 497-506.
Papineni, et al., "BLEU: A Method for Automatic Evaluation of Machine Translation", In Proceedings of 40th Annual Meeting on Association for Computational Linguistics, Jul. 6, 2002, pp. 311-318.
Pasupat, et al., "Compositional Semantic Parsing on Semi-Structured Tables", In Proceedings of the 53rd Annual Meeting of the Association for Computational Linguistics and the 7th International Joint Conference on Natural Language Processing, Jul. 26, 2015, pp. 1470-1480.
"International Search Report and Written Opinion Issued in PCT Application No. PCT/US19/037410", dated Aug. 27, 2019, 16 Pages.
"International Search Report and Written Opinion Issued In PCT Application No. PCT/US19/065314", dated Apr. 1, 2020, 14 Pages.
Pennington, et al., "Glove: Global Vectors for Word Representation", In Proceedings of the Conference on Empirical Methods in Natural language Processing, Oct. 25, 2014, pp. 1532-1543.
Poon, Hoifung, "Grounded Unsupervised Semantic Parsing", In Proceedings of the 51st Annual Meeting of the Association for Computational Linguistics, Aug. 4, 2013, pp. 933-943.
Poon, et al., "Unsupervised Semantic Parsing", In Proceedings of the Conference on Empirical Methods in Natural Language Processing, Aug. 6, 2009, pp. 1-10.
Popescu, et al., "Modern Natural Language interfaces to Databases: Composing Statistical Parsing With Semantic Tractability", In Proceedings of 20th International Conference on Computational Linguistics, Aug. 23, 2004, 7 Pages.
Porter, MF, "An Algorithm for Suffix Stripping", In Journal of Program, vol. 14, Issue 3, Jul. 1980, pp. 130-137.
Raghu, et al., "A statistical approach for Non-Sentential Utterance Resolution for Interactive QA System", In Proceedings of the 16th Annual Meeting of the Special Interest Group on Discourse and Dialogue, Sep. 2, 2015, pp. 335-343.
Ramshaw, et al., "Text Chunking Using Transformation-Based Learning", In Book of Natural Language Processing Using Very Large Corpora, 1999, pp. 157-176.
Reddy, et al., "Transforming Dependency Structures to Logical Forms for Semantic Parsing", In Journal of Transactions of the Association for Computational Linguistics, vol. 4, Apr. 2016, pp. 127-140.
Reddy, et al., "Universal Semantic Parsing", In Proceedings of the Conference on Empirical Methods in Natural Language Processing, Sep. 7, 2017, pp. 89-101.
Ren, et al., "Conversational/Multitum Question Understanding", In Proceedings of the international Conference on the Theory of Information Retrieval, Oct. 1, 2017, 04 Pages.
Richardson, et al., "Learning to Make Inferences in a Semantic Parsing Task", In Proceedings of the Transactions of the Association for Computational Linguistics, vol. 4, May 2, 2016, pp. 155-168.
Setlur, et al., "Eviza: A Natural Language Interface for Visual Analysis", In Proceedings of the 29th Annual Symposium on User Interface Software and Technology, Oct. 16, 2016, pp. 365-377.
Shah, et al., "Bootstrapping a Neural Conversational Agent with Dialogue Self-Play, Crowdsourcing and On-Line Reinforcement Learning", In Proceedings of the Conference of the North American Chapter of the Association for Computational Linguistics: Human Language Technologies, Jun. 1, 2018, pp. 41-51.
Sordoni, et al., "A Neural Network Approach to Context-Sensitive Generation of Conversational Responses", In Proceedings of the Annual Conference of the North American Chapter of the Association for Computational Linguistics—Human Language Technologies, May 31, 2015, pp. 196-205.
Stern, et al., "A Minimal Span-Based Neural Constituency Parser", In Proceedings of the 55th Annual Meeting of the Association for Computational Linguistics, Jul. 30, 2017, pp. 818-827.
Suhr, et al., "Learning to Map Context-Dependent Sentences to Executable Formal Queries", In Proceedings of the Conference of the North American Chapter of the Association for Computational Linguistics: Human Language Technologies, Jun. 1, 2018, pp. 2238-2249.
Wong, et al., "Learning Synchronous Grammars for Semantic Parsing with Lambda Calculus", In Proceedings of the 45th Annual Meeting of the Association of Computational Linguistics, Jun. 25, 2007, pp. 960-967.
Xu, et al., "Sqlnet: Generating Structured Queries From Natural Language Without Reinforcement Learning", In Repository of arXiv:1711.04436, Nov. 13, 2017, 13 Pages.
Yaghmazadeh, et al., "SQLizer: Query Synthesis from Natural Language", In Proceedings of the ACM on Programming Languages, vol. 1, Article 63, Oct. 2017, 26 Pages.
Zettlemoyer, et al., "Learning Context-Dependeni Mappings from Sentences to Logical Form", In Proceedings of the Joint Conference of the 47th Annual Meeting of the ACL and the 4th International Joint Conference on Natural Language Processing of the AFNLP, Aug. 2, 2009, pp. 976-984.
Zettlemoyer, et al., "Online Learning of Relaxed CCG Grammars for Parsing to Logical Form", In Proceedings of 13th Joint Conference on Empirical Methods in Natural Language Processing and Computational Natural Language Learning, Jun. 28, 2007, pp. 678-687.
Zhang, et al., "Macro Grammars and Holistic Triggering for Efficient Semantic Parsing", In Proceedings of the Conference on Empirical Methods in Natural Language Processing, Sep. 7, 2017, pp. 1214-1223.
Zhong,, et al., "Seq2SQL: Generating Structured Queries from Natural Language using Reinforcement Learning", In Journal of Computing Research Repository, Aug. 31, 2017, 13 Pages.
"Office Action Issued in European Patent Application No. 19737618. 9", dated Aug. 11, 2022, 12 Pages.

* cited by examiner

CONVERSION OF NATURAL LANGUAGE QUERY

CROSS-REFERENCE TO RELATED APPLICATION

This application is a U.S. National Stage Filing under 35 U.S.C. 371 of International Patent Application Serial No. PCT/US2019/065314, filed Dec. 10, 2019, and published as WO 2020/149959 A1 on Jul. 23, 2020, which claims priority to Chinese Application No. 201910108419.1, filed Jan. 18, 2019, which applications and publication are incorporated herein by reference in their entirety.

BACKGROUND

Natural Language Interfaces to Database (NLIDB) allows a user to query the database with a natural language, to relieve the user from the burden of learning the database query language. Compared with the traditional method which queries the database with Structured Query Language (SQL), NLIDB provides pbetter interactive experience. The natural language query can be automatically converted, via the semantic parsing techniques, into a computer-executable query (e.g., SQL query) to retrieve an answer from the database. At present, the technical solution for NLIDB usually assumes that the natural language query is context-independent. However, multiple rounds of interactions with NLIDB may involve multiple semantically dependent queries. In this case, it is required to combine the contextual information to correctly understand the query intent of the user.

SUMMARY

In accordance with implementations of the present disclosure, a solution for converting a natural language query is provided. In this solution, a first natural language query and a second natural language query for one or more data tables are received, wherein semantics of the second natural language query is dependent on the first natural language query. A third natural language query for one or more data tables is generated based on the first natural language query and the second natural language query, wherein semantics of the third natural language query is identical to the semantics of the second natural language query and independent of the first natural language query. In this way, this solution can convert a context-dependent natural language query into a context-independent natural language query, thereby enabling interfacing with any semantic parsers which can convert a natural language query into a computer-executable query, so as to implement a query operation on one or more data tables.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Throughout the drawings, the same or similar reference signs refer to the same or similar elements.

DETAILED DESCRIPTION

Figure 1:
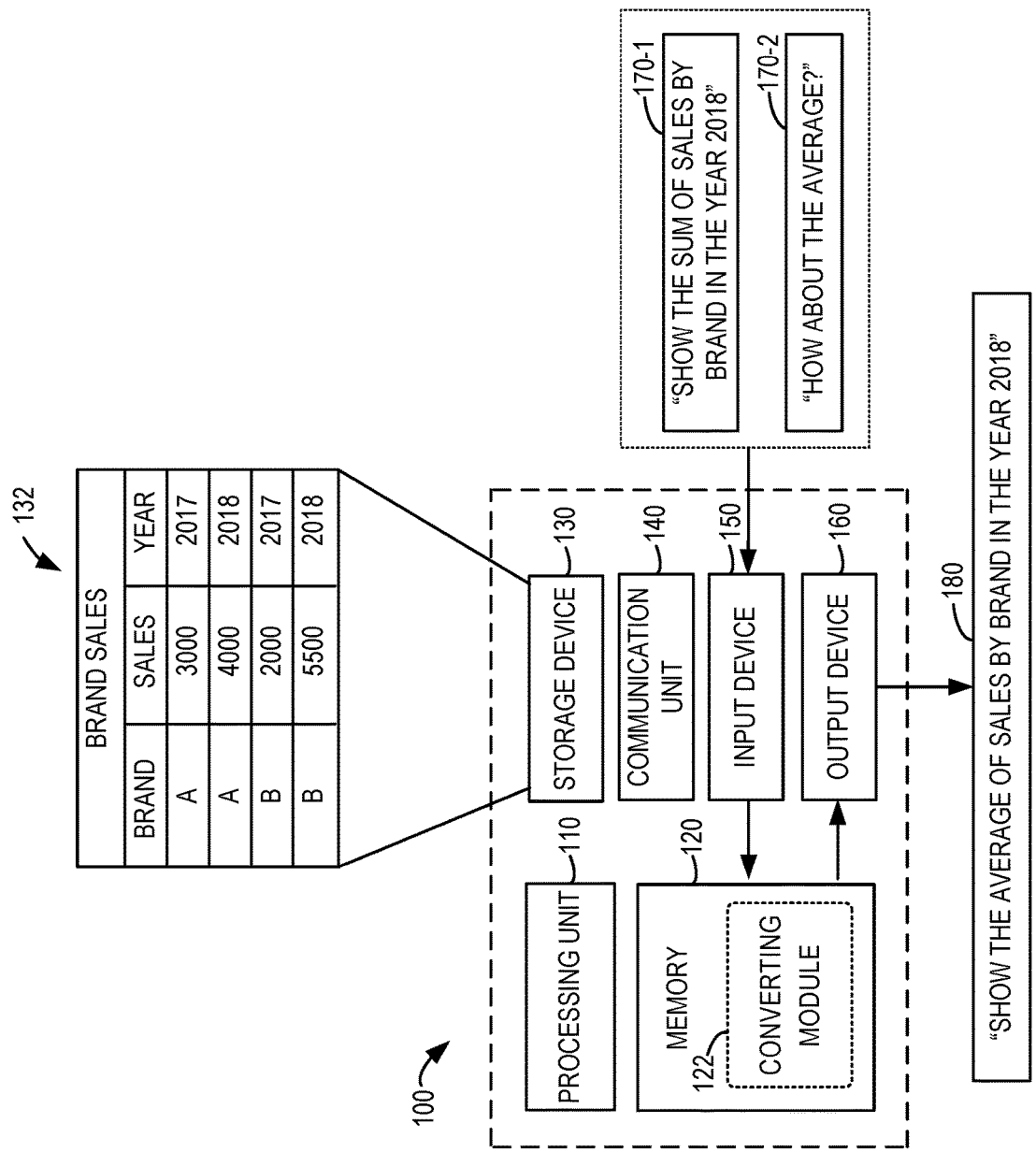
FIG. 1 illustrates a block diagram of a computing device which can implement a plurality of implementations of the present disclosure.

The present disclosure will now be discussed with reference to several example implementations. It is to be understood these implementations are discussed only for the purpose of enabling those skilled persons in the art to better understand and thus implement the present disclosure, rather than suggesting any limitations on the scope of the subject matter.

As used herein, the term "includes" and its variants are to be read as open terms that mean "includes, but is not limited to". The term "based on" is to be read as "based at least in part on". The term "one implementation" and "an implementation" are to be read as "at least one implementation". The term "another implementation" is to be read as "at least one other implementation". The terms "first", "second" and the like may refer to different or same objects. Other definitions, explicit and implicit, may be included below.

As used herein, the term "natural language" refers to a daily language practiced by human beings for written and verbal communications. Examples of the natural language include Chinese, English, German, Spanish, French and the like. In the following description, English will act as the example of the natural language. However, it should be understood that this is merely for the purpose of illustration and is not intended to limit the scope of the present disclosure. Implementations of the present disclosure can be applicable to a variety of different natural languages.

As mentioned above, NLIDB allows a user to query the database with a natural language, to relieve the user from the burden of learning the database query language. The natural language query can be automatically converted, via the semantic parsing techniques, into a computer-executable query (e.g., SQL query) to retrieve an answer from the database.

However, multiple rounds of interactions with NLIDB may involve multiple semantically dependent queries. In other words, the current query initiated by a user may be dependent on a certain precedent query in the multiple rounds of interactions with the NLIDB. For example, the user may have already initiated a query "Show the sales in 2017" and then initiate an elliptic query "How about 2018?" In this case, it is required to combine the contextual information to correctly understand the query intent of the user.

For the purpose of simplification, the above multiple rounds of queries will be discussed below by taking two rounds of queries as the example. The two rounds of queries described herein include a context-independent precedent natural language query (also referred to as "first natural language query", "first query" or "precedent query" in the following) and a follow-up natural language query (also referred to as "second natural language query", "second query" or "follow-up query") whose semantics are dependent on the precedent natural language query. It should be understood that the precedent query and the follow-up query described herein are not necessarily two consecutive queries but instead only refer to two semantically dependent queries.

Some traditional solutions analyze, based on a particular data set in a particular domain (e.g., the aerospace domain), the follow-up query whose semantics are dependent on the precedent query, so as to generate a SQL query corresponding to the follow-up query. However, these methods are often limited to use in specific areas and are difficult to apply to different data sets. Some traditional solutions may restrict the scenario of the follow-up query. For example, it may be required that results of the follow-up query must be a subset of results of the precedent query. In addition, the traditional solutions usually parse the follow-up natural language query, whose semantics are dependent on the precedent query, directly into a corresponding SQL query. Therefore, the traditional solutions rely on the implementation of a specific semantic parser for parsing a natural language query into an SQL query, which accordingly increases processing and/or computation overheads.

Problems existing in the current solutions of analyzing the follow-up natural language query have been discussed above. In accordance with implementations of the present disclosure, there is provided a solution for converting a natural language query, so as to solve one or more of the above problems or other potential problems. In this solution, a first natural language query and a second natural language query for one or more data tables are received, wherein semantics of the second natural language query is dependent on the first natural language query. A third natural language query for one or more data tables is generated based on the first natural language query and the second natural language query, wherein semantics of the third natural language query is identical to the semantics of the second natural language query and independent of the first natural language query.

In this way, this solution can convert a context-dependent natural language query into a context-independent natural language query. In addition, this solution has no restrictions on the applicable field, dataset, query scenario, type of natural language, type of a downstream parser and the number of targeted data tables or databases and the like and thus is highly flexible. Being independent of the implementation of the specific semantic parser, this solution can effectively reduce processing and/or computation overheads, thereby achieving higher system performance.

Various example implementations of the solution are further described in details below with reference to the drawings.

Example Environment

FIG. 1 illustrates a block diagram of a computing device 100 that can carry out a plurality of implementations of the present disclosure. It should be understood that the computing device 100 shown in FIG. 1 is only exemplary, without suggesting any limitation to functions and the scope of the implementations of the present disclosure. According to FIG. 1, the computing device 100 includes a computing device 100 in the form of a general purpose computing device. Components of the computing device 100 can include, but not limited to, one or more processors or processing units 110, memory 120, storage device 130, one or more communication units 140, one or more input devices 150 and one or more output devices 160.

In some implementations, the computing device 100 can be implemented as various user terminals or service terminals with computing power. The service terminals can be servers, large-scale computing devices and the like provided by a variety of service providers. The user terminal, for example, is mobile terminal, fixed terminal or portable terminal of any types, including mobile phone, site, unit, device, multimedia computer, multimedia tablet, Internet nodes, communicator, desktop computer, laptop computer, notebook computer, netbook computer, tablet computer, Personal Communication System (PCS) device, personal navigation device, Personal Digital Assistant (PDA), audio/video player, digital camera/video, positioning device, television receiver, radio broadcast receiver, electronic book device, gaming device or any other combinations thereof consisting of accessories and peripherals of these devices or any other combinations thereof. It can also be predicted that the computing device 100 can support any types of user-specific interfaces (such as "wearable" circuit and the like).

The processing unit 110 can be a physical or virtual processor and can execute various processing based on the programs stored in the memory 120. In a multi-processor system, a plurality of processing units executes computer-executable instructions in parallel to enhance parallel processing capability of the computing device 100. The processing unit 110 also can be known as central processing unit (CPU), microprocessor, controller and microcontroller.

The computing device 100 usually includes a plurality of computer storage media. Such media can be any attainable media accessible by the computing device 100, including but not limited to volatile and non-volatile media, removable and non-removable media. The memory 120 can be a volatile memory (e.g., register, cache, Random Access Memory (RAM)), a non-volatile memory (such as, Read-Only Memory (ROM), Electrically Erasable Programmable Read-Only Memory (EEPROM), flash), or any combinations thereof. The memory 120 can include a converting module 122 configured to execute functions of various implementations described herein. The converting module 122 can be accessed and operated by the processing unit 110 to perform corresponding functions.

The storage device 130 can be removable or non-removable medium, and can include machine readable medium, which can be used for storing information and/or data and can be accessed within the computing device 100. The computing device 100 can further include a further removable/non-removable, volatile/non-volatile storage medium. Although not shown in FIG. 1, there can be provided a disk drive for reading from or writing into a removable and non-volatile disk and an optical disk drive for reading from or writing into a removable and non-volatile optical disk. In such cases, each drive can be connected via one or more data medium interfaces to the bus (not shown).

The communication unit 140 implements communication with another computing device through communication media. Additionally, functions of components of the computing device 100 can be realized by a single computing cluster or a plurality of computing machines, and these computing machines can communicate through communication connections. Therefore, the computing device 100 can be operated in a networked environment using a logic connection to one or more other servers, a Personal Computer (PC) or a further general network node.

The input device 150 can be one or more various input devices, such as mouse, keyboard, trackball, voice-input device and the like. The output device 160 can be one or more output devices, e.g., display, loudspeaker and printer etc. The computing device 100 also can communicate through the communication unit 140 with one or more external devices (not shown) as required, wherein the external device, e.g., storage device, display device etc., communicates with one or more devices that enable the users to interact with the computing device 100, or with any devices (such as network card, modem and the like) that enable the computing device 100 to communicate with one or more other computing devices. Such communication can be executed via Input/Output (I/O) interface (not shown).

In some implementations, apart from being integrated on an individual device, some or all of the respective components of the computing device 100 also can be set in the form of cloud computing architecture. In the cloud computing architecture, these components can be remotely arranged and can cooperate to implement the functions described by the present disclosure. In some implementations, the cloud computing provides computation, software, data access and storage services without informing a terminal user of physical positions or configurations of systems or hardware providing such services. In various implementations, the cloud computing provides services via Wide Area Network (such as Internet) using a suitable protocol. For example, the cloud computing provider provides, via the Wide Area Network, the applications, which can be accessed through a web browser or any other computing components. Software or components of the cloud computing architecture and corresponding data can be stored on a server at a remote position. The computing resources in the cloud computing environment can be merged or spread at a remote datacenter. The cloud computing infrastructure can provide, via a shared datacenter, the services even though they are shown as a single access point for the user. Therefore, components and functions described herein can be provided using the cloud computing architecture from a service provider at a remote position. Alternatively, components and functions also can be provided from a conventional server, or they can be mounted on a client device directly or in other ways.

The computing device 100 can convert a context-dependent natural language query into a context-independent natural language query according to implementations of the present disclosure. As shown in FIG. 1, the computing device 100 can receive, via the input device 150, natural language queries 170-1 and 170-2 for a data table 132, where semantics of the natural language query 170-2 is dependent on the natural language query 170-1. In the example of FIG. 1, the natural language query 170-1 is, for example, "Show the sum of sales by brand in the year 2018" and the natural language query 170-2 is, for example, "How about the average?" According to FIG. 1, the data table 132 may include, for example, a table name "Brand Sales", a plurality of column names "Brand", "Sales" and "Year" and data items defined by rows and columns.

The natural language queries 170-1 and 170-2 are inputted into the converting module 122 in the memory 120. The converting module 122 may convert the natural language query 170-2 whose semantics are dependent on the natural language query 170-1 into a natural language query 180 corresponding to its semantics, where semantics of the natural language query 180 is independent of the natural language query 170-1. In the example of FIG. 1, the natural language query 180 is, for example, "Show the average of sales by brand in the year 2018".

It should be understood that the natural language queries 170-1, 170-2 and 180 and the data table 132 in FIG. 1 are provided only for the purpose of illustration, without suggesting any limitation to the scope of the present disclosure. The natural language queries 170-1, 170-2 and 180 may involve various scenarios, including but not limited to, analysis, comparison, computation and statistics, acquisition of extremum, filtering, grouping, sorting and searching etc. For example, Table 1 illustrates example scenarios that may be involved in a natural language query and their corresponding examples in accordance with implementations of the present disclosure.

TABLE 1

Exemplary Scenarios of Natural Language Queries

| Scenarios | Examples |
| --- | --- |
| Analysis | 170-1: In 1995, is there any network named CBC? |
| | 170-2: Any TSN? |
| | 180: In 1995, is there any network named TSN? |
| Comparison | 170-1: How much money has Smith earned? |
| | 170-2: Compared it with Bill Collins. |
| | 180: Compare money Smith earned with Bill Collins. |
| Computation and Analysis | 170-1: List all universities founded before 1855. |
| | 170-2: Show their number. |
| | 180: Show the number of all universities founded before 1855. |
| Acquisition of Extremum | 170-1: Which stadium has the most capacity? |
| | 170-2: Which get the highest attendance? |
| | 180: Which stadium gets the highest attendance? |
| Filtering | 170-1: How many roles are from studio paramount? |
| | 170-2: List all titles produced by that studio. |
| | 180: List all titles produced by studio paramount. |
| Grouping | 170-1: Show the industry which has the most companies? |
| | 170-2: Show in different countries. |
| | 180: Show the industry which has the most companies in different countries. |
| Sorting | 170-1: Show all chassis produced after the year 1990. |
| | 170-2: Sort them by year. |
| | 180: Show all chassis produced after the year 1990 and sort by year. |
| Searching | 170-1: What position did Sid O'Neill play? |
| | 170-2: Which players else are in the same position? |
| | 180: Which players play in the position of Sid O'Neill excluding Sid O'Neill? |

In addition, although English acts as the example of the natural language, it should be understood that the implementations of the present disclosure are also applicable to various natural languages. In addition, although the natural language queries illustrated in FIG. 1 are targeted to one data table 132, it should be understood that the implementations of the present disclosure also are also applicable to natural language queries for multiple data tables.

Working Principle

In accordance with implementations of the present disclosure, a solution for converting a natural language query is provided. In this solution, a first natural language query and a second natural language query for one or more data tables are received, wherein semantics of the second natural language query is dependent on the first natural language query. A third natural language query for one or more data tables is generated based on the first natural language query and the second natural language query, wherein semantics of the third natural language query is identical to the semantics of the second natural language query and independent of the first natural language query. In this way, this solution can convert a context-dependent natural language query into a context-independent natural language query, thereby enabling interfacing with any semantic parsers which can convert a natural language query into a computer-executable query, so as to implement a query operation on one or more data tables.

Figure 2:
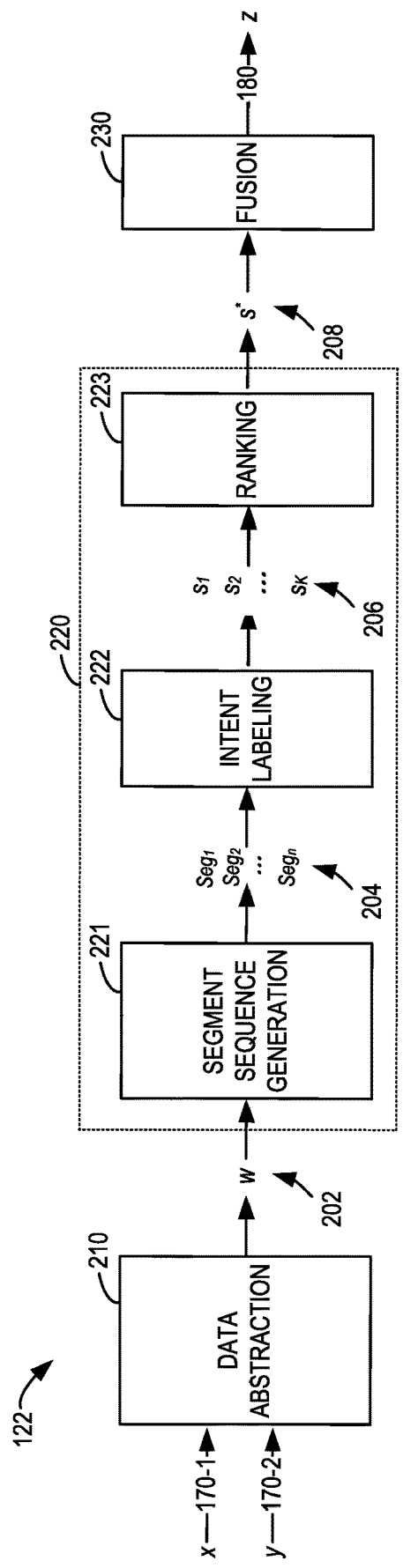
FIG. 2 illustrates a block diagram of a converting module for converting a natural language query in accordance with implementations of the present disclosure.

FIG. 2 illustrates a block diagram of a converting module 122 for converting the natural language query in accordance with implementations of the present disclosure. The converting module 122 can be implemented in the computing device 100 of FIG. 1. As shown, the converting module 122 includes a data abstraction module 210, a semantic analysis module 220 and a fusion module 230.

Data Abstraction

The data abstraction module 210 may receive the natural language queries 170-1 and 170-2 for one or more data tables, wherein semantics of the natural language query 170-2 depend on the natural language query 170-1. As shown in FIG. 2, the natural language query 170-1 is also denoted as x and the natural language query 170-2 is also denoted as y. Each of the natural language queries 170-1 and 170-2 can be considered as a natural language-based sentence consisting of a plurality of words. Depending on the language used in the natural language query, the plurality of words can be the words included in the natural language. Each of the one or more data tables can include a table name, row and/or column names, and data items defined by rows and columns. One example of the data table is the data set 132 shown in FIG. 1. The data table is a query object of the natural language queries 170-1 and 170-2, i.e., it is expected to acquire a query result from the data table. In some implementations, the natural language used in the natural language queries 170-1 and 170-2 can be identical to the natural language presenting the data table. In some implementations, these two natural languages can be different. Different natural languages only affect how the data abstraction process replaces symbols, which can be achieved through natural language translation.

In some implementations, the data abstraction module 210 may execute the data abstraction operation. Specifically, the natural language query 170-1 may include a first group of words while the natural language query 170-2 may contain a second group of words. The data abstraction module 210 can concatenate the first group of words and the second group of words into a sequence of words and convert the sequence of words into a sequence of symbols 202 by replacing a plurality of words in the sequence of words with corresponding symbols in the predefined symbol table, where the sequence of symbols may be represented as w.

In a sentence of the natural language query, words can be divided into two types: query-related words and rhetorical words. The query-related words, for example, can clearly indicate query parameters (e.g., parameters of SQL clauses) whereas the rhetorical words usually are used for forming a sentence pattern of the query sentence only. According to FIG. 1, words, such as "sum", "sales", "brand", "year" and "2018" etc., in the precedent query 170-1 "Show the sum of sales by brand in the year 2018" can be considered as query-related words while others are rhetorical words. In the follow-up query 170-2 "How about the average?", the word "average" can be deemed as the query-related word and the rest are rhetorical words.

Table 2 illustrates an exemplary symbol table predefined for the query-related words in accordance with implementations of the present disclosure. In some implementations, the data abstraction module 210 may identify the query-related words in the sequence of words concatenated by the precedent query 170-1 and the follow-up query 170-2 and replace the words with corresponding symbols, for example, in Table 2, to generate a sequence of symbols corresponding to the sequence of words. It should be understood that Table 2 is provided only for the purpose of illustration, without suggesting any limitation to the scope of the present disclosure. In other implementations, different symbol tables can be employed. Moreover, for different natural languages, words corresponding to the symbols in the symbol table can be replaced accordingly, which can be realized by mutual translation of natural language.

TABLE 2

Exemplary Symbol Table for Words Indicating Query Parameters

| Symbols | Meanings | Examples |
| --- | --- | --- |
| Col | Column Name | sale, country |
| Val | Unit Value | 2018 |
| Agg | Aggregation | sum, maximum, count |
| Com | Comparison | more, later, higher |
| Dir | Sorting Direction | descending, ascending |
| Per | Personal Pronouns | it, he, them |
| Pos | Possessive Pronouns | its, his, their |
| Dem | Demonstrative Pronouns | that, those, other |

In Table 2, for example, symbols Col and Val are associated with the data table and other symbols are related to the language. The query-related words can be determined, for the symbols associated with the data table, from the data table (e.g., data table 132 shown by FIG. 1) targeted by each query. It should be noted that all numbers and dates belong to Val. Replacing column names and cell values by Col and Val is the key to equip the data abstraction module 210 with the ability of operating across different data tables. Regarding the language-related symbols, symbols {Per, Pos, Dem} represent pronouns and other symbols are used for different types of SQL operators. For example, symbol Agg corresponds to an aggregation function; symbol Com indicates a comparison operator; and symbol Dir denotes direction of ORDERYBY Since the meanings of the language-related symbols are limited to a narrow space, it is viable to enumerate the most common analysis-specific words empirically. For example, symbol Pos can correspond to words their, its, his, her and the like, while symbol Agg can correspond to words average, sum, count, maximum and the like.

In this way, for example, the sequence of symbols generated for the precedent query 170-1 "Show the sum of sales by brand in the year 2018" in FIG. 1 is "Show the Agg of Col by Colin the Col Val". In the following, the sequence of symbols corresponding to the precedent query is also denoted as $\hat{x}$. The sequence of symbols generated for the follow-up query 170-2 "How about the average?" in FIG. 1 is "How about the Agg". In the text below, the sequence of symbols corresponding to the follow-up query is also indicated as $\hat{y}$.

Figure 3:
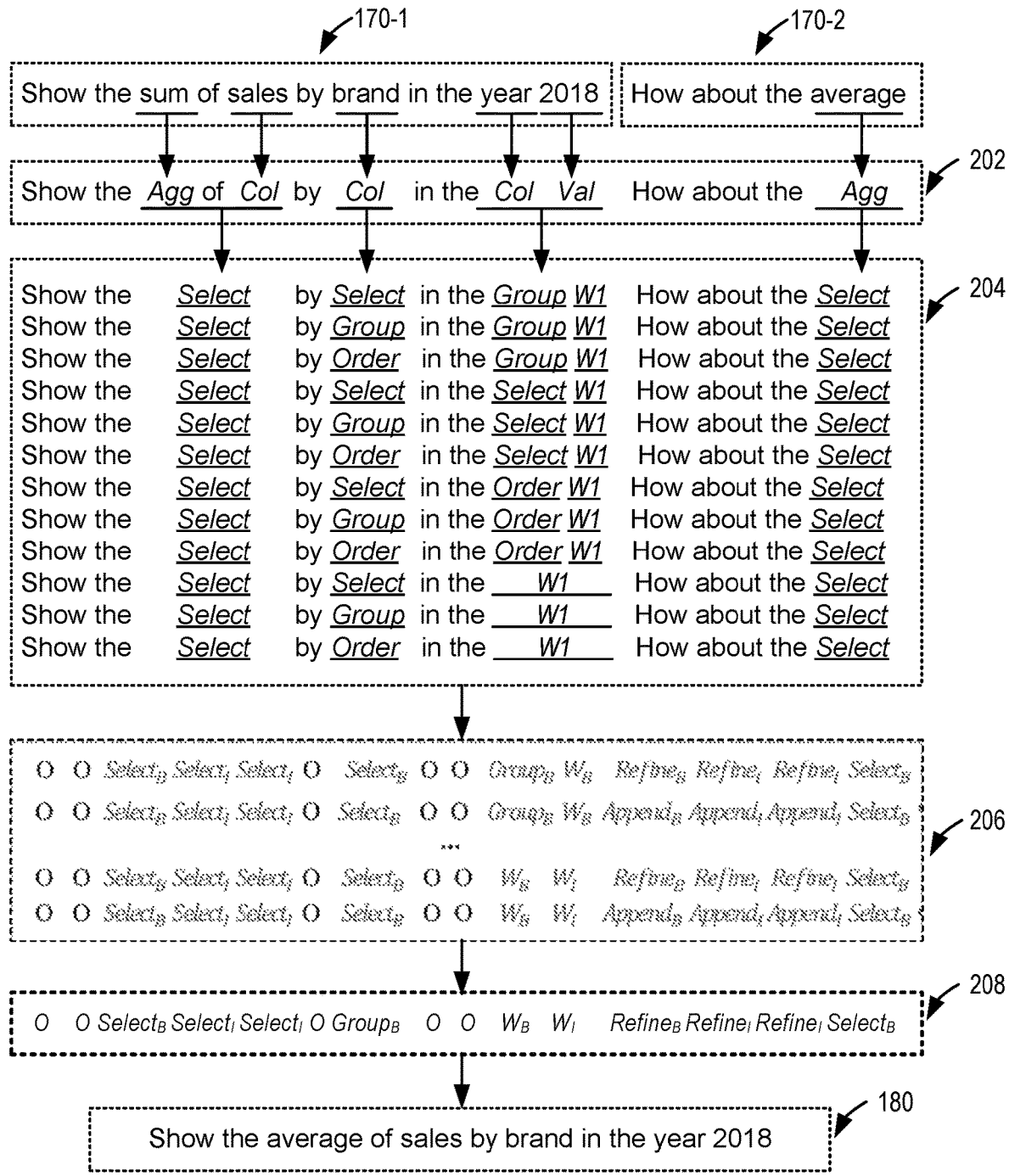
FIG. 3 illustrates a schematic diagram of a procedure for converting a context-dependent natural language query into a context-independent natural language query in accordance with implementations of the present disclosure.

The sequence of symbols generated for the sequence of words concatenated by the precedent query 170-1 and the follow-up query 170-2 is shown as the sequence of symbols 202 in FIG. 3. It can be seen that the order in which the plurality of predetermined symbols in the symbol sequence 202 are arranged is the same as the order in which the corresponding plurality of words are in the sequence of words concatenated by the natural language queries 170-1 and 170-2. The data abstraction process is to map the original words in the word sequence to finite predefined symbols in the predefined symbol table, which can reduce the difficulty of parsing too many words in different natural languages.

Semantic Analysis

With reference back to FIG. 2, where the sequence of symbols 202 can be provided to the semantic analysis module 220. As shown in FIG. 2, the semantic analysis module 220, for example, may include a segment sequence generating unit 221, an intent labeling unit 222 and a ranking unit 223.

In some implementations, the segment sequence generating unit 221 may receive a sequence of symbols 202 generated by the data abstraction module 210 and convert the sequence of symbols 202 into a plurality of segment sequences 204 by applying a set of deduction rules to the sequence of symbols 202. In the following text, the plurality of segment sequences generated by the segment sequence generating unit 221 are also denoted as $Seg_1, Seg_2, \ldots, Seg_n$ (where n is a natural number). Each segment sequence may represent a prediction of semantics of the sequence of symbols 202.

The predefined symbol, with which the query-related word is replaced, can reflect the intrinsic semantics of the word, but ignore the contents around it. For example, it is assumed that the precedent query 170-1 "Show the sum of sales by brand in the year 2018" has been parsed into an SQL sentence. Although the words "brand" and "year" both correspond to the same symbol Col, they belong to different SQL clauses. As an adjacent word "2018" corresponding to the symbol Val exists around the word "year", the word "year" in fact corresponds to the SQL clause "WHERE year=2018". Since a rhetorical word like "by" exists around the word "brand", it actually corresponds to the SQL clause "GROUPBY brand".

In some implementations, in order to capture the influence of the rhetorical word over the query-related words, a plurality of predefined segments can be defined to combine adjacent predefined symbols and capture the exerted influence of the rhetorical word. For example, one or more deduction rules can be defined, where each deduction rule specifies a corresponding relation between a combination of adjacent predefined symbols and a corresponding predefined segment. As used herein, "adjacent predefined symbols" indicates that there are no other words than the rhetorical words between two predefined symbols, and the number of words between the two predefined symbols is lower than a predefined threshold (e.g., 4). If the number of words between the two predefined symbols exceeds the predefined threshold, the two predefined symbols cannot be combined.

Table 3 illustrates 8 exemplary types of segments and their corresponding exemplary deduction rules in accordance with implementations of the present disclosure. It should be appreciated that Table 3 is provided merely for the purpose of illustration, without suggesting any limitation to the scope of the present disclosure. In other implementations, different types of segments and/or deduction rules can be used. In Table 3, "[ ]" is used for indicating an optional symbol, and W and P respectively represent WHERE and pronounces.

TABLE 3

Exemplary Segments and Deduction Rules Thereof

| Segment | Deduction Rule |
|---|---|
| Select | [Agg + [Val]] + Col |
| Order | [Dir] + Col |
| W1 | [Col] + [Com] + Val |
| W2 | Col + Com + Col |
| Group | Col |

TABLE 3-continued

Exemplary Segments and Deduction Rules Thereof

| Segment | Deduction Rule |
|---|---|
| P1 | Per |
| P2 | Pos |
| P3 | Dem + Col |

It can be seen from Table 3 that each deduction rule in the deduction rule set shown in Table 3 specifies a corresponding relation between the combination of the adjacent predefined symbols and a predefined segment. The design of the deduction rules originates from the SQL clauses. In some implementations, the segment sequence generating unit 221 may identify, for each deduction rule in the deduction rule set shown in Table 3, a combination of adjacent symbols in the sequence of symbols 202. Afterwards, the segment sequence generating unit 221 can replace the identified combination of adjacent symbols with a corresponding segment, thereby generating a segment sequence corresponding to the sequence of symbols 202.

Because there are various ways of combining symbols, the segment sequence generating unit 221 can convert the sequence of symbols 202 into a plurality of segment sequences 204, where each segment sequence represents a prediction of semantics of the sequence of symbols 202.

FIG. 3 illustrates examples of a plurality of segment sequences 204 converted from the sequence of symbols 202. According to FIG. 3, "sum of sales" (corresponding to the symbol combination "Agg of Col" in the sequence of symbols 202) in the precedent query 170-1 corresponds to the segment "Select" in Table 3, which corresponds to the SQL clause "SELECT SUM(sales)". However, the overlapping of the deduction rules in Table 3 leads to the presence of various combinations of symbols. For example, "year" (corresponding to symbol "Col" in the sequence of symbols 202) in the precedent query 170-1 can solely correspond to segments "Select", "Order" and "Group" in Table 3. In addition, the combination of "year" and "2018" (corresponding to symbols "Col Val" in the sequence of symbols 202) in the precedent query 170-1 can correspond to the segment "$W_1$" in Table 3.

In some implementations, in order to make the deduction rules more robust, the segment sequence generating unit 221 can leave out the order of symbols. For example, the symbol combinations "[Dir] Col" and "Col [Dir]" are both considered to be equal to the symbol combination "[Dir]+Col" and thus correspond to the segment "Order".

In some implementations, each deduction rule in the deduction rule set shown in Table 3 can be directly applied into the precedent query since it usually have a complete sentence structure. However, ellipsis usually exists in the follow-up query to a certain degree, when a deduction rule is applied to the follow-up queries, all symbols in the first five deduction rules of Table 3 become optional. As such, "average" in the follow-up query 170-2 can correspond to segment "Select" in Table 3 even though there is no symbol "Col" combined with the symbol "Agg" corresponding to "average". Besides, the symbols in the precedent query cannot combine with the symbols in the follow-up query. Therefore, the segment sequence generating unit 221 can generate 12 segment sequences corresponding to the sequence of symbols 202, as shown by 204 in FIG. 3.

With reference to FIG. 4, where a plurality of segment sequences 204 can be provided to the intent labeling unit 222, which can determine one or more possible intents of the follow-up query. In some implementations, the intent labeling unit 222 can determine, based on the sentence structure of the follow-up query, possible intents of the follow-up query. The sentence structure can be determined by multiple rhetorical words before the first query-related word in the follow-up query. The possible intents of the follow-up query can include, but not limited to: changing a certain query parameter of the precedent query and/or comparing with the query result of the precedent query. In some embodiments, if the first query-related word has no rhetorical words in the follow-up query, the possible intent of the follow-up query can be determined as changing a certain query parameter of the precedent query. Alternatively, in some embodiments, the possible intent of the follow-up query can include both changing a certain query parameter of the precedent query and comparing with the query result of the precedent query.

The intent labeling unit 222 can further label each segment sequence of the plurality of segment sequences 204 using a corresponding label indicating each possible intent of the one or more possible intents, so as to generate a labeled segment sequence (also known as "tag sequence") reflecting the possible intent. That is, the intent labeling unit 222 can generate, for each segment sequence of the plurality of segment sequences 204, one or more labeled segment sequences reflecting one or more possible intents. In this way, the intent labeling unit 222 can generate, for the plurality of segment sequences 204, a plurality of labeled segment sequences 206 denoted as $s_1, s_2, \ldots, s_K$ (wherein K is a natural number). For example, each labeled segment sequence represents a predication of semantics corresponding to the sequence of symbols 202 while reflecting a corresponding query intent.

In some implementations, for the sake of simplicity, when generating the labeled segment sequence, the segment {W1, W2} can be uniformly represented as W and the segment {P1, P2, P3} can be uniformly represented as P. An additional segment O can be utilized to represent those words in the precedent query that do not correspond to any of segments in Table 3. Besides, when the pronouns are ambiguouse, for example, "that" used as a conjunction, the symbols {Per, Pos, Dem} also can be deduced as the segment O.

Additionally or alternatively, in some implementations, each segment can be labeled with B (Beginning) and I (Inside) labels. By taking the segment sequence "Show the Select by Select in the Group W1 How about the Select" corresponding to the query 170-1 "Show the sum of sales by brand in the year 2018" as an example, the segment "Select" corresponding to "sum of sales" can be converted into a segment combination "$Select_B$ $Select_1$ $Select_1$", where the labeled segment "$Select_B$" corresponds to the word "sum" to indicate an initial word corresponding to the segment "Select" and the subsequent two labeled segments "$Select_1$" respectively correspond to the words "of" and "sales" to indicate the follow-up words corresponding to the segment "Select". In addition, regarding the segment sequence "How about the Select" corresponding to the follow-up query 170-2 "How about the average", "How about the" therein can be converted into a labeled segment combination "$Refine_B$ $Refine_1$ $Refine_1$" to indicate an intent of changing a certain query parameter of the precedent query 170-1 or can be converted into a labeled segment combination "$Append_B$ $Append_1$ $Append_1$" to indicate an intent of comparing with the query result of the precedent query 170-1. In this way, the intent labeling unit 222 can generate a plurality of labeled segment sequences corresponding to the plurality of segment sequences 204 and labeled with corresponding query intents, as shown by 206 in FIG. 3.

With reference to FIG. 2, where the plurality of labeled segment sequences 206 can be provided to the ranking unit 223, which may select, from the plurality of labeled segment sequences 206, one labeled segment sequence 208 having a highest degree of matching with the semantics and the intent of the follow-up query 170-2. The labeled segment sequence 208 is represented as s* (selected from the labeled segment sequence set $\{s_1, s_2, \ldots, s_k\}$). In some implementations, the labeled segment sequence having a highest degree of matching with the semantics and the intent of the follow-up query 170-2 can be selected from the plurality of labeled segment sequences 206 using a trained ranking model, as shown by 208 in FIG. 3. For example, the ranking model can be trained based on a weakly supervised learning method. The details of the model training will be further discussed in the following text.

Fusion

As shown in FIG. 2, the selected labeled segment sequence 208 can be provided to the fusion module 230, which can generate, based on the labeled segment sequence 208, a natural language query 180 corresponding to the follow-up query 180-2. The natural language query 180 is represented as z. The natural language query 180 is also known as "fused query", whose semantics are independent of the natural language query 170-1.

In some implementations, the fusion module 230 can determine, based on the labeled segment sequence 208, an actual intent of the follow-up query 170-2. For example, as shown in FIG. 3, the labeled segment sequence 208 is "O O $Select_B Select_1 Select_1$ O $Select_B$ O O $W_B$ $W_1$ $Refine_B$ $Refine_1$ $Refine_1$ $Select_B$" and the indicated query intent is to change a certain query parameter of the precedent query 170-1. Besides, the fusion module 230 can determine, from the plurality of segment sequences 204, a segment sequence corresponding to the labeled segment sequence 208 and generate a fused query 180 based on the determined actual intent and segment sequence. For example, the segment sequence corresponding to the labeled segment sequence 208 "O O $Select_B$ $Select_1$ $Select_1$ O $Group_B$ O O $W_B$ $W_1$ $Refine_B$ $Refine_1$ $Refine_1$ $Select_B$" in the plurality of segment sequences 204 is "Show the Select by Group in the W1 How about the Select". To generate the fused query 180, the fusion module 230 can divide the above segment sequence into a first sub-sequence "Show the Select by Select in the W1" corresponding to the precedent query 170-1 and a second sub-sequence "How about the Select" corresponding to the follow-up query 170-2. The fusion module 230 can determining, from among the first sub-sequence and the second sub-sequence, a pair of segments conflicting with each other. Then, the fusion module 230 can generate the fused query 180 by performing the fusing operation on the pair of conflicting segments based on the determined actual intent of the follow-up query 170-2.

The pair of conflicting segments indicates that the two segments in the pair have identical or incompatible semantics. In some implementations, the segments of the same type conflict with each other. For example, two Select segments conflict with one another. However, there are also some special cases. In some implementations, for example, two segments W1 conflict with one another only when their inner symbol Val are located in the same column of the data table (e.g., data table 132 shown in FIG. 1). Additionally or alternatively, in order to adapt to the query situation for multiple data tables, similarity of the two segments can be determined, in some implementations, by calculating the similarity of the symbols involved with the two segments and/or similarity of semantics of the query context related to the two segments. When the similarity of the two segments exceeds a threshold, the two segments can be considered as conflicting with each other.

Figure 4A:
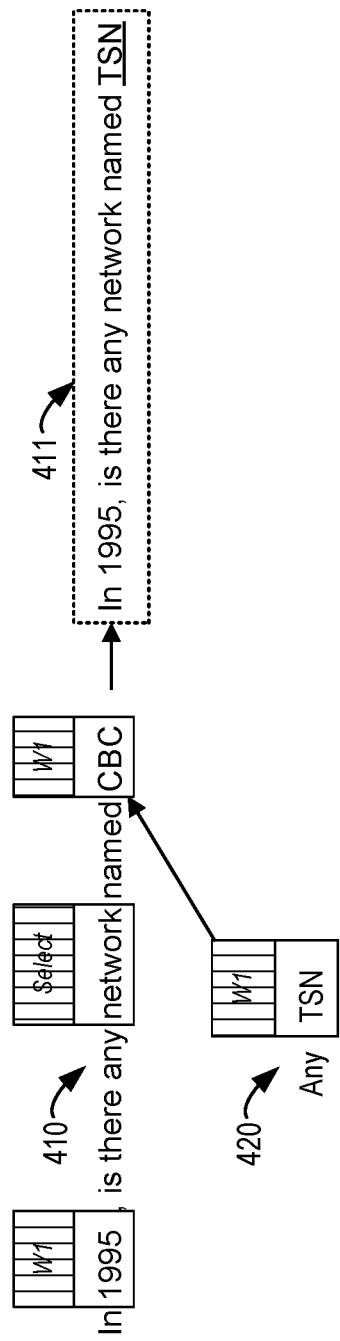
FIGS. 4A and 4B illustrate a schematic diagram of executing a fusion operation on a pair of conflicting segments in accordance with implementations of the present disclosure.
Figure 4B:
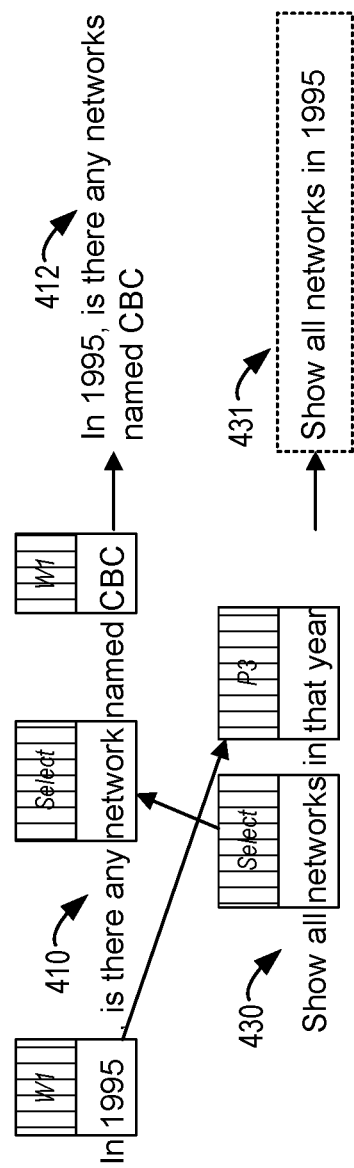

FIGS. 4A and 4B illustrate schematic diagrams of executing the fusing operation on the conflicting segments in accordance with implementations of the present disclosure. FIG. 4A illustrates a precedent query 410 "In 1995, is there any network named CBC" and a follow-up query 420 "Any TSN". As shown in FIG. 4, the segment W1 corresponding to the word "TSN" in the query 420 and the segment W1 corresponding to the word "CBC" in the query 410 form a pair of conflicting segments, since "TSN" and "CBC" are located in the same column (e.g., the "network" column) of the data table. In some implementations, for the pronoun-related segments P1, P2 and P3, for example, the fusion module 230 may determine the pair of conflicting segments based on the following semantics conflicting rule: P3 (corresponding to the symbol combination "Dem+Col") conflicts with the segment W1 describing the same column in the data table. FIG. 4B illustrates a precedent query 410 "In 1995, is there any network named CBD" and a follow-up query 430 "Show all networks in the year". As shown in FIG. 4B, the segment P3 corresponding to the words "that year" in the query 430 and the segment W1 corresponding to the word "1995" in the query 410 form a pair of conflicting segments, since "that year" and "1995" are targeted at the same column (e.g., the "year" column) of the data table.

Here, it is assumed that the pair of conflicting segments determined by the fusion module 230 includes a first segment corresponding to a first sub-sequence of the precedent query and a second segment corresponding to a second sub-sequence of the follow-up query, where the first segment may correspond to a first word in the precedent query and the second segment may correspond to a second word in the follow-up query. In some implementations, the fusing operation on the pair of conflicting segments can be performed by replacing one word of the first word and the second word with the other. For example, as shown in FIG. 4A, the word "CBC" in the precedent query 410 can be replaced with the word "TSN" in the follow-up query 420, so as to generate the fused query 411 "In 1995, is there any network named TSN". As shown in FIG. 4B, the words "that year" in the follow-up query 430 can be replaced with the word "1995" in the precedent query 410 to generate a fused query 431 "Show all networks in 1995". The word "network" in the precedent query 410 can be replaced with the word "networks" in the follow-up query 430 to generate a fused query 412 "In 1995, is there any networks named CBC". In the example shown in FIG. 4B, the fusion module 230 can finally select the fused query 431 as the outputted fused query z, which is a context-independent natural language query corresponding to the follow-up query 430.

Figure 5:
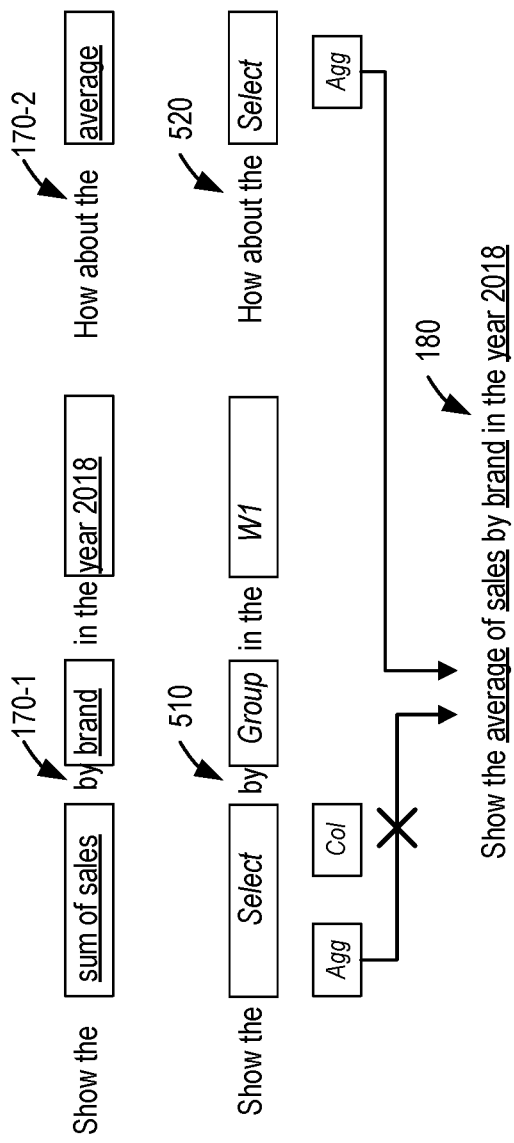
FIG. 5 illustrates a schematic diagram of executing a fusion operation on a pair of conflicting segments in accordance with implementations of the present disclosure.

In some implementations, when there is no pronoun in the pair of words corresponding to the pair of conflicting segments, the above word replacement can be based on symbols. FIG. 5 illustrates a schematic diagram of executing the fusing operation on the conflicting segments in accordance with implementations of the present disclosure. As shown, the fusion module 230, for example, divides the determined segment sequence "Show the Select by Group in the W1 How about the Select" into a first sub-sequence 410 (i.e., "Show the Select by Group in the W1") corresponding to the precedent 170-1 and a second sub-sequence 420 (i.e., "How about the Select") corresponding to the follow-up query 170-2. "Sum of sales" (corresponding to the symbol combination "Agg of Cop" in the sequence of symbols 202) in the precedent query 170-1 corresponds to the segment Select and "average" (corresponding to symbol "Agg" in the sequence of symbols 202) in the follow-up query 170-2 also corresponds to the segment Select. Since the two segments both are the same segment Select, it can be determined that these two are a pair of conflicting segments. Because the fusion module 230 determines that the actual intent of the follow-up query 170-2 is to change a certain query parameter of the precedent query 170-1, the fusion module 230 can replace the word "sum" corresponding to the symbol "Agg" in the precedent query 170-1 with the word "average" corresponding to the symbol "Agg" in the follow-up query 170-2, thereby forming the fused query 180, i.e., "Show the average of sales by brand in the year 2018".

As described above, the fusion module 230 can determine, based on the selected labeled segment sequence, the actual intent of the follow-up query. In some implementations, when the fusion module 230 determines that the actual intent of the follow-up query is to compare with the query result of the precedent query, the fusing operation on the pair of conflicting segments can be implemented by attaching the second word in the follow-up query to the first word in the precedent query. For example, it is assumed that the precedent query is "How much money has Smith earned" and the follow-up query is "Compared with Bill Collins". Since the fusion module 230 has determined that the actual intent of the follow-up query is to compare with the query result of the precedent query, the fusion module 230 can generate the fused query by attaching the word "Bill Collins" to the word "Smith", e.g., "How much money has Smith and Bill Collins earned". Alternatively, in some implementations, when the fusion module 230 determines that the actual intent of the follow-up query is to compare with the query result of the precedent query, the fusing operation on the pair of conflicting segments can be performed by attaching the first word in the precedent query to the second word in the follow-up query. For example, regarding the above example, the fusion module 230 also can generate the fused query by attaching the word "Smith" to the word "Bill Collins", for example, "Compare money Smith earned with Bill Collins".

Ranking Model

As described above, in the semantic analysis module 220 shown by FIG. 2, the ranking unit 223 may select, from a plurality of labeled segment sequences 206, one labeled segment sequence 208 having a highest degree of matching with the semantics and the intent of the follow-up query 170-2, where the labeled segment sequence 208 may be denoted as s*. In some implementations, the labeled segment sequence that best matches with the semantics and the intent of the follow-up query can be selected from the plurality of labeled segment sequences 206 using a trained ranking model. The generation and usage of the ranking model will be discussed in details below.

In the following discussion, the sequence of symbols generated from the sequence concatenated by the precedent query 170-1 and the follow-up query 170-2 is represented as $w=(w_1, w_2, \ldots, w_N)$, where N represents the number of symbols in the sequence of symbols and $N \geq 1$ and $w_i$ ($i \in [1, N]$) represents a symbol in the sequence of symbols. The set of labeled segment sequences 206 generated by the intent labeling unit 222 is represented as $S=\{s_1, s_2, \ldots, s_K\}$, where K represents the number of labeled segment sequences, and one labeled segment sequence of the labeled segment sequence set is $s_k=(t_1^k, t_2^k, \ldots, t_N^k)$, where $k \in [1, K]$. The expected optimal labeled segment sequence s* can be represented as follows:

$$s^* = \underset{s \in S}{\operatorname{argmax}} g(s \mid \Theta) \tag{1}$$

Where $g(\cdot \mid \Theta)$ is a score function given the parameter set $\Theta$. In some implementations, the labeled segment sequence set S can be ranked using a bidirectional Long Short Term Memory-Conditional Random Field (LSTM-CRF) trained based on the weakly supervised max-margin learning method.

Specifically, for each $w_i$ ($i \in [1, N]$), the bidirectional LSTM-CRF model computes a hidden state $h_i = [\vec{h}_i; \overleftarrow{h}_t]$ and the forward hidden state is represented as:

$$\vec{h}_i = \overrightarrow{LSTM}(\phi(w_i); \vec{h}_{i-1}) \tag{2}$$

Where $\phi$ is an embedding function initialized using a word characterizing tool Glove (Global Vectors for Word Representation). Let T represent the number of labels and $f_i$ denote the T-dimensional network score vector for $w_i$, which can be computed as:

$$f_i = h_i W \tag{3}$$

where W is the learned matrix. Let A denote the T×T transition matrix of CRF layer, and the entry Auv is the probability of transferring from label u to v. Let $\theta$ denote the parameters of network in LSTM. Given $\Theta = \{A, W, \theta\}$, the score function for the labeled segment sequence $s_k$ is defined as the sum of two parts: transition score by CRF and network score by bidirectional LSTM, which can be formulated as:

$$g(s_k \mid \Theta) = \sum_{i=1}^{N} \left( A_{t_{i-1}^k, t_i^k} + f_i[t_i^k] \right) \tag{4}$$

where $t_i^k$ is a label corresponding to the symbol $w_i$ in the labeled segment sequence $s_k$.

A procedure for training the bidirectional LSTM-CRF model is further discussed below based on the weakly supervised learning method. In some implementations, the bidirectional LSTM-CRF model is trained based on the weakly supervised learning method which uses the actual fused query in the natural language as supervision.

Specifically, in some implementations, for each labeled segment sequence $s_k \in S$, fusion can be performed based on its corresponding segment sequence and intent (as described in the above section of "fusion") and a natural language query $z_k$ is obtained. Let z* denote an actual fused query corresponding to the labeled segment sequence, which can come from the pre-acquired training data. In order to compare $z_k$ and z*, the data abstraction procedure (as described in the above section "Data Abstraction") can be executed on them to generate a corresponding sequence of symbols, where the pronouns can be ignored. Then, the symbols in the two sequences of symbols can be checked. If the two sequences of symbols have identical symbols associated with the same corresponding word, they are symbol consistent and $s_k$ is put in a positive set P; otherwise, they are symbol inconsistent and $s_k$ can be put in a negative set N. It can be seen that S=P∪N. However, the label sequences in P are not all correct. After fusion and data abstraction, the sequences with wrong labels may result in symbol consistency by chance. Only one label sequence in S may be correct, and the correct one is always in P. As symbol consistence is the requirement of correctness on labels, the scores of all label sequences in S are calculated and the highest ones are respectively selected from P and N:

$$\hat{s}_p = \underset{s \in P}{\operatorname{argmax}} g(s \mid \Theta), \quad \hat{s}_n = \underset{s \in N}{\operatorname{argmax}} g(s \mid \Theta) \tag{5}$$

Then, a max-margin learning method can be employed to encourage a margin of at least $\Delta$ between $\hat{s}_p$ and $\hat{s}_n$. Considering various lengths of different inputs, normalization factors can be added to the scores. The hinge penalty is formulated as:

$$\max\left(0, \Delta - \frac{g(\hat{s}_p \mid \Theta)}{|\hat{s}_p|} + \frac{g(\hat{s}_n \mid \Theta)}{|\hat{s}_n|}\right). \tag{6}$$

where $\Delta > 0$ is a hyper-parameter. In some implementations, the bidirectional LSTM-CRF model can be trained based on the penalty function as described in the above equation (6).

It should be understood that the above contents only illustrate an example of a ranking model that the ranking unit 223 can use to determine an optimal labeled segment sequence. It should be appreciated that other models also can be used instead of the bidirectional LSTM-CRF model as described above. The scope of the present disclosure is not limited in this regard.

Exemplary Procedure

Figure 6:
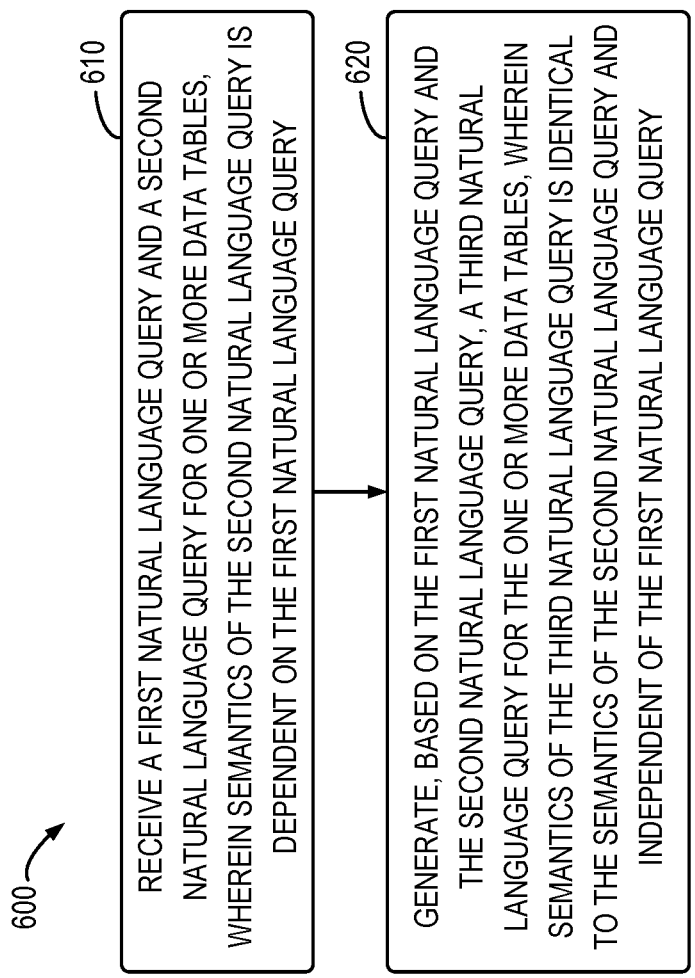
FIG. 6 illustrates a flowchart of a method for converting a natural language query in accordance with implementations of the present disclosure.

FIG. 6 illustrates a flowchart of a method 600 for converting natural language queries in accordance with some implementations of the present disclosure. The method 600 can be implemented by the computing device 100, e.g., at the converting module 122 in the memory 120 of the computing device 100. At 610, the computing device 100 receives a first natural language query and a second natural language query for one or more data tables, where semantics of the second natural language query is dependent on the first natural language query. At 620, the computing device 100 generates, based on the first natural language query and the second natural language query, a third natural language query for the one or more data tables, where semantics of the third natural language query is identical to the semantics of the second natural language query and independent of the first natural language query.

In some implementations, the first natural language query comprises a first group of words and the second natural language query comprises a second group of words, and generating the third natural language query comprises: incorporating the first group of words and the second group of words into a sequence of words; converting the sequence of words into a sequence of symbols by replacing one or more words in the sequence of words with corresponding symbols in a predefined symbol table; converting the sequence of symbols into a plurality of segment sequences by applying a set of deduction rules to the sequence of symbols, wherein one segment sequence represents a prediction of semantics of the sequence of symbols; and generating the third natural language query based on one of the plurality of segment sequences.

In some implementations, converting the sequence of words into the sequence of symbols comprises: identifying a query-related word in the sequence of words; determining, from the predefined symbol table, a symbol representing semantics of the word; and replacing the word in the sequence of words with the symbol.

In some implementations, a deduction rule of the set of deduction rules assigns a corresponding relation between a combination of adjacent predefined symbols and a predefined segment, and converting the sequence of symbols into the plurality of segment sequences comprises: for the deduction rule of the set of deduction rules, identifying the combination of adjacent predefined symbols in the sequence of symbols; and replacing the combination of adjacent predefined symbols in the sequence of symbols with the predefined segment.

In some implementations, generating the third natural language query based on one of the plurality of segment sequences comprises: determining, based on a sentence pattern of the second natural language query, one or more possible intents of the second natural language query; for a segment sequence of the plurality of segment sequences, labeling the segment sequence respectively with corresponding labels indicating the one or more possible intents, to derive one or more labeled segment sequences reflecting the one or more possible intents; selecting, from a plurality of labeled segment sequences derived from labeling the plurality of segment sequences, a labeled segment sequence having a degree of matching with semantics of the second natural language query exceeding a threshold matching degree; and generating, based on the selected labeled segment sequence, the third natural language query.

In some implementations, the one or more possible intents of the second natural language intent comprise at least one of the following: changing a query parameter of the first natural language query; or comparing with a query result of the first natural language query.

In some implementations, selecting the labeled segment sequence from the plurality of labeled segment sequences comprises: selecting, from the plurality of labeled segment sequences, the labeled segment sequence having a highest degree of matching with semantics of the second natural language query using a trained ranking model, wherein the ranking model is trained based on a weakly supervised learning method.

In some implementations, generating the third natural language query based on the selected labeled segment sequence comprises: determining, based on the selected labeled segment sequence, an actual intent of the second natural language query; determining, from the plurality of segment sequences, a segment sequence corresponding to the selected labeled segment sequence; and generating, based on the actual intent and the determined segment sequence, the third natural language query.

In some implementations, generating the third natural language query based on the actual intent and the determined segment sequence comprises: dividing the determined segment sequence into a first sub-sequence corresponding to the first natural language query and a second sub-sequence corresponding to the second natural language query; determining, from among the first sub-sequence and the second sub-sequence, a pair of segments conflicting with each other; and generating, based on the actual intent, the third natural language query by executing a fusion operation on the pair of segments.

In some implementations, the pair of segments comprise a first segment from the first sub-sequence and a second segment from the second sub-sequence, the first segment is associated with a first word in the first natural language query and the second segment is associated with a second word in the second natural language query, and generating the third natural language query by executing the fusion operation on the pair of segments comprises: in response to the actual intent of the second natural language query being to change a query parameter of the first natural language query, replacing the second word in the second natural language query with the first word in the first natural language query, or replacing the first word in the first natural language query with the second word in the second natural language query; and generating the third natural language query based on the replaced first natural language query or the replaced second natural language query.

In some implementations, the pair of segments comprise a first segment from the first sub-sequence and a second segment from the second sub-sequence, the first segment is associated with a first word in the first natural language query and the second segment is associated with a second word in the second natural language query, and generating the third natural language query by executing the fusion operation on the pair of segments comprises: in response to the actual intent of the second natural language query being to compare with a query result of the first natural language query, attaching the second word in the second natural language query to the first word in the first natural language query, or attaching the first word in the first natural language query to the second word in the second natural language query; and generating the third natural language query based on the first natural language query attached with the second word or the second natural language query attached with the first word.

In view of the above description, it can be seen that the solution for converting natural language queries in accordance with the present disclosure can convert a context-dependent natural language query into a context-independent natural language query. In addition, this solution has no restrictions on the applicable field, dataset, query scenario, type of natural language, type of a downstream parser and the number of targeted data tables or databases and the like and thus is highly flexible. Being independent of the implementation of the specific semantic parser, this solution can effectively reduce processing and/or computation overheads, thereby achieving higher system performance.

Exemplary Implementations

Some exemplary implementations of the present disclosure are listed below.

In one aspect, the present disclosure provides a computer-implemented method. The method comprises: receiving a first natural language query and a second natural language query for one or more data tables, wherein semantics of the second natural language query is dependent on the first natural language query; and generating, based on the first natural language query and the second natural language query, a third natural language query for the one or more data tables, wherein semantics of the third natural language query is identical to the semantics of the second natural language query and independent of the first natural language query.

In some implementations, the first natural language query comprises a first group of words and the second natural language query comprises a second group of words, and generating the third natural language query comprises: incorporating the first group of words and the second group of words into a sequence of words; converting the sequence of words into a sequence of symbols by replacing one or more words in the sequence of words with corresponding symbols in a predefined symbol table; converting the sequence of symbols into a plurality of segment sequences by applying a set of deduction rules to the sequence of symbols, wherein one segment sequence represents a prediction of semantics of the sequence of symbols; and generating the third natural language query based on one of the plurality of segment sequences.

In some implementations, converting the sequence of words into the sequence of symbols comprises: identifying a query-related word in the sequence of words; determining, from the predefined symbol table, a symbol representing semantics of the word; and replacing the word in the sequence of words with the symbol.

In some implementations, a deduction rule of the set of deduction rules assigns a corresponding relation between a combination of adjacent predefined symbols and a predefined segment, and converting the sequence of symbols into the plurality of segment sequences comprises: for the deduction rule of the set of deduction rules, identifying the combination of adjacent predefined symbols in the sequence of symbols; and replacing the combination of adjacent predefined symbols in the sequence of symbols with the predefined segment.

In some implementations, generating the third natural language query based on one of the plurality of segment sequences comprises: determining, based on a sentence pattern of the second natural language query, one or more possible intents of the second natural language query; for a segment sequence of the plurality of segment sequences, labeling the segment sequence respectively with corresponding labels indicating the one or more possible intents, to derive one or more labeled segment sequences reflecting the one or more possible intents; selecting, from a plurality of labeled segment sequences derived from labeling the plurality of segment sequences, a labeled segment sequence having a degree of matching with semantics of the second natural language query exceeding a threshold matching degree; and generating, based on the selected labeled segment sequence, the third natural language query.

In some implementations, the one or more possible intents of the second natural language intent comprise at least one of the following: changing a query parameter of the first natural language query; or comparing with a query result of the first natural language query.

In some implementations, selecting the labeled segment sequence from the plurality of labeled segment sequences comprises: selecting, from the plurality of labeled segment sequences, the labeled segment sequence having a highest degree of matching with semantics of the second natural language query using a trained ranking model, wherein the ranking model is trained based on a weakly supervised learning method.

In some implementations, generating the third natural language query based on the selected labeled segment sequence comprises: determining, based on the selected labeled segment sequence, an actual intent of the second natural language query; determining, from the plurality of segment sequences, a segment sequence corresponding to the selected labeled segment sequence; and generating, based on the actual intent and the determined segment sequence, the third natural language query.

In some implementations, generating the third natural language query based on the actual intent and the determined segment sequence comprises: dividing the determined segment sequence into a first sub-sequence corresponding to the first natural language query and a second sub-sequence corresponding to the second natural language query; determining, from among the first sub-sequence and the second sub-sequence, a pair of segments conflicting with each other; and generating, based on the actual intent, the third natural language query by executing a fusion operation on the pair of segments.

In some implementations, the pair of segments comprise a first segment from the first sub-sequence and a second segment from the second sub-sequence, the first segment is associated with a first word in the first natural language query and the second segment is associated with a second word in the second natural language query, and generating the third natural language query by executing the fusion operation on the pair of segments comprises: in response to the actual intent of the second natural language query being to change a query parameter of the first natural language query, replacing the second word in the second natural language query with the first word in the first natural language query, or replacing the first word in the first natural language query with the second word in the second natural language query; and generating the third natural language query based on the replaced first natural language query or the replaced second natural language query.

In some implementations, the pair of segments comprise a first segment from the first sub-sequence and a second segment from the second sub-sequence, the first segment is associated with a first word in the first natural language query and the second segment is associated with a second word in the second natural language query, and generating the third natural language query by executing the fusion operation on the pair of segments comprises: in response to the actual intent of the second natural language query being to compare with a query result of the first natural language query, attaching the second word in the second natural language query to the first word in the first natural language query, or attaching the first word in the first natural language query to the second word in the second natural language query; and generating the third natural language query based on the first natural language query attached with the second word or the second natural language query attached with the first word.

In another aspect, the present disclosure provides an electronic device. The electronic device comprises: a processing unit; and a memory coupled to the processing unit and having instructions stored thereon, the instructions, when executed by the processing unit, causing the device to perform actions comprising: receiving a first natural language query and a second natural language query for one or more data tables, wherein semantics of the second natural language query is dependent on the first natural language query; and generating, based on the first natural language query and the second natural language query, a third natural language query for the one or more data tables, wherein semantics of the third natural language query is identical to the semantics of the second natural language query and independent of the first natural language query.

In some implementations, the first natural language query comprises a first group of words and the second natural language query comprises a second group of words, and generating the third natural language query comprises: incorporating the first group of words and the second group of words into a sequence of words; converting the sequence of words into a sequence of symbols by replacing one or more words in the sequence of words with corresponding symbols in a predefined symbol table; converting the sequence of symbols into a plurality of segment sequences by applying a set of deduction rules to the sequence of symbols, wherein one segment sequence represents a prediction of semantics of the sequence of symbols; and generating the third natural language query based on one of the plurality of segment sequences.

In some implementations, converting the sequence of words into the sequence of symbols comprises: identifying a query-related word in the sequence of words; determining, from the predefined symbol table, a symbol representing semantics of the word; and replacing the word in the sequence of words with the symbol.

In some implementations, a deduction rule of the set of deduction rules assigns a corresponding relation between a combination of adjacent predefined symbols and a predefined segment, and converting the sequence of symbols into the plurality of segment sequences comprises: for the deduction rule of the set of deduction rules, identifying the combination of adjacent predefined symbols in the sequence of symbols; and replacing the combination of adjacent predefined symbols in the sequence of symbols with the predefined segment.

In some implementations, generating the third natural language query based on one of the plurality of segment sequences comprises: determining, based on a sentence pattern of the second natural language query, one or more possible intents of the second natural language query; for a segment sequence of the plurality of segment sequences, labeling the segment sequence respectively with corresponding labels indicating the one or more possible intents, to derive one or more labeled segment sequences reflecting the one or more possible intents; selecting, from a plurality of labeled segment sequences derived from labeling the plurality of segment sequences, a labeled segment sequence having a degree of matching with semantics of the second natural language query exceeding a threshold matching degree; and generating, based on the selected labeled segment sequence, the third natural language query.

In some implementations, the one or more possible intents of the second natural language intent comprise at least one of the following: changing a query parameter of the first natural language query; or comparing with a query result of the first natural language query.

In some implementations, selecting the labeled segment sequence from the plurality of labeled segment sequences comprises: selecting, from the plurality of labeled segment sequences, the labeled segment sequence having a highest degree of matching with semantics of the second natural language query using a trained ranking model, wherein the ranking model is trained based on a weakly supervised learning method.

In some implementations, generating the third natural language query based on the selected labeled segment sequence comprises: determining, based on the selected labeled segment sequence, an actual intent of the second natural language query; determining, from the plurality of segment sequences, a segment sequence corresponding to the selected labeled segment sequence; and generating, based on the actual intent and the determined segment sequence, the third natural language query.

In some implementations, generating the third natural language query based on the actual intent and the determined segment sequence comprises: dividing the determined segment sequence into a first sub-sequence corresponding to the first natural language query and a second sub-sequence corresponding to the second natural language query; determining, from among the first sub-sequence and the second sub-sequence, a pair of segments conflicting with each other; and generating, based on the actual intent, the third natural language query by executing a fusion operation on the pair of segments.

In some implementations, the pair of segments comprise a first segment from the first sub-sequence and a second segment from the second sub-sequence, the first segment is associated with a first word in the first natural language query and the second segment is associated with a second word in the second natural language query, and generating the third natural language query by executing the fusion operation on the pair of segments comprises: in response to the actual intent of the second natural language query being to change a query parameter of the first natural language query, replacing the second word in the second natural language query with the first word in the first natural language query, or replacing the first word in the first natural language query with the second word in the second natural language query; and generating the third natural language query based on the replaced first natural language query or the replaced second natural language query.

In some implementations, the pair of segments comprise a first segment from the first sub-sequence and a second segment from the second sub-sequence, the first segment is associated with a first word in the first natural language query and the second segment is associated with a second word in the second natural language query, and generating the third natural language query by executing the fusion operation on the pair of segments comprises: in response to the actual intent of the second natural language query being to compare with a query result of the first natural language query, attaching the second word in the second natural language query to the first word in the first natural language query, or attaching the first word in the first natural language query to the second word in the second natural language query; and generating the third natural language query based on the first natural language query attached with the second word or the second natural language query attached with the first word.

In a further aspect, the present disclosure provides a computer program product tangibly stored in a non-transitory computer storage medium and including machine-executable instructions, the machine-executable instructions, when executed by a device, causing the device to perform the method of the above aspect.

In a further aspect, the present disclosure provides a computer-readable medium having machine-executable instructions stored thereon, the machine-executable instructions, when executed by a device, causing the device to perform the method of the above aspect.

The functionality described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, it should be understood that the operations are required to be executed in the shown particular order or in a sequential order, or all shown operations are required to be executed to achieve the expected results. In certain circumstances, multitasking and parallel processing may be advantageous. Likewise, while several specific implementation details are contained in the above discussions, these should not be construed as limitations on the scope of the subject matter described herein. Certain features that are described in the context of separate implementations may also be implemented in combination in a single implementation. Conversely, various features that are described in the context of a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:

1. A computer-implemented method, comprising:
    receiving a first natural language query and a second natural language query for one or more data tables, wherein semantics of the second natural language query is dependent on the first natural language query; and
    generating, based on the first natural language query and the second natural language query, a third natural language query for the one or more data tables, wherein the first natural language query comprises a first group of words and the second natural language query comprises a second group of words, and generating the third natural language query comprises:
    incorporating the first group of words and the second group of words into a sequence of words;
    converting the sequence of words into a sequence of symbols by replacing one or more words in the sequence of words with corresponding symbols in a predefined symbol table;
    converting the sequence of symbols into a plurality of segment sequences by applying a set of deduction rules to the sequence of symbols, wherein one segment sequence represents a prediction of semantics of the sequence of symbols; and
    generating the third natural language query based on one of the plurality of segment sequences.

2. The method of claim 1, wherein converting the sequence of words into the sequence of symbols comprises:
    identifying a query-related word in the sequence of words;
    determining, from the predefined symbol table, a symbol representing semantics of the word; and
    replacing the word in the sequence of words with the symbol.

3. The method of claim 1, wherein a deduction rule of the set of deduction rules assigns a corresponding relation between a combination of adjacent predefined symbols and a predefined segment, and converting the sequence of symbols into the plurality of segment sequences comprises:
    for the deduction rule of the set of deduction rules,
    identifying the combination of adjacent predefined symbols in the sequence of symbols; and
    replacing the combination of adjacent predefined symbols in the sequence of symbols with the predefined segment.

4. The method of claim 1, wherein generating the third natural language query based on one of the plurality of segment sequences comprises:
    determining, based on a sentence pattern of the second natural language query, one or more possible intents of the second natural language query;
    for a segment sequence of the plurality of segment sequences, labeling the segment sequence respectively with corresponding labels indicating the one or more possible intents to derive one or more labeled segment sequences reflecting the one or more possible intents;
    selecting, from a plurality of labeled segment sequences derived from labeling the plurality of segment sequences, a labeled segment sequence having a degree of matching with semantics of the second natural language query exceeding a threshold matching degree; and
    generating, based on the selected labeled segment sequence, the third natural language query.

5. The method of claim 4, wherein the one or more possible intents of the second natural language intent comprise at least one of the following:
    changing a query parameter of the first natural language query; or
    comparing with a query result of the first natural language query.

6. The method of claim 4, wherein selecting the labeled segment sequence from the plurality of labeled segment sequences comprises:
    selecting, from the plurality of labeled segment sequences, the labeled segment sequence having a highest degree of matching with semantics of the second natural language query using a trained ranking model,
    wherein the ranking model is trained based on a weakly supervised learning method.

7. The method of claim 4, wherein generating the third natural language query based on the selected labeled segment sequence comprises:
    determining, based on the selected labeled segment sequence, an actual intent of the second natural language query;
    determining, from the plurality of segment sequences, a segment sequence corresponding to the selected labeled segment sequence; and generating, based on the actual intent and the determined segment sequence, the third natural language query.

8. The method of claim 7, wherein generating the third natural language query based on the actual intent and the determined segment sequence comprises:
dividing the determined segment sequence into a first sub-sequence corresponding to the first natural language query and a second sub-sequence corresponding to the second natural language query;
determining, from among the first sub-sequence and the second sub-sequence, a pair of segments conflicting with each other; and
generating, based on the actual intent, the third natural language query by executing a fusion operation on the pair of segments.

9. The method of claim 8, wherein the pair of segments comprise a first segment from the first sub-sequence and a second segment from the second sub-sequence, the first segment is associated with a first word in the first natural language query and the second segment is associated with a second word in the second natural language query, and generating the third natural language query by executing the fusion operation on the pair of segments comprises:
in response to the actual intent of the second natural language query being to change a query parameter of the first natural language query,
replacing the second word in the second natural language query with the first word in the first natural language query, or
replacing the first word in the first natural language query with the second word in the second natural language query; and
generating the third natural language query based on the replaced first natural language query or the replaced second natural language query.

10. The method of claim 8, wherein the pair of segments comprise a first segment from the first sub-sequence and a second segment from the second sub-sequence, the first segment is associated with a first word in the first natural language query and the second segment is associated with a second word in the second natural language query, and generating the third natural language query by executing the fusion operation on the pair of segments comprises:
in response to the actual intent of the second natural language query being to compare with a query result of the first natural language query,
attaching the second word in the second natural language query to the first word in the first natural language query, or
attaching the first word in the first natural language query to the second word in the second natural language query; and
generating the third natural language query based on the first natural language query attached with the second word or the second natural language query attached with the first word.

11. An electronic device, comprising:
a processing unit; and
a memory coupled to the processing unit and having instructions stored thereon, the instructions, when executed by the processing unit, causing the device to perform actions comprising:
receiving a first natural language query and a second natural language query for one or more data tables, wherein semantics of the second natural language query is dependent on the first natural language query; and
generating, based on the first natural language query and the second natural language query, a third natural language query for the one or more data tables wherein the first natural language query comprises a first group of words and the second natural language query comprises a second group of words, and generating the third natural language query comprises:
incorporating the first group of words and the second group of words into a sequence of words;
converting the sequence of words into a sequence of symbols by replacing one or more words in the sequence of words with corresponding symbols in a predefined symbol table;
converting the sequence of symbols into a plurality of segment sequences by applying a set of deduction rules to the sequence of symbols, wherein one segment sequence represents a prediction of semantics of the sequence of symbols; and
generating the third natural language query based on one of the plurality of segment sequences.

12. The device of claim 11, wherein converting the sequence of words into the sequence of symbols comprises:
identifying a query-related word in the sequence of words;
determining, from the predefined symbol table, a symbol representing semantics of the word; and
replacing the word in the sequence of words with the symbol.

13. A computer program product tangibly stored in a non-transitory computer storage medium and including machine-executable instructions, the machine-executable instructions, when executed by a device, causing the device to perform actions comprising:
receiving a first natural language query and a second natural language query for one or more data tables, wherein semantics of the second natural language query is dependent on the first natural language query; and
generating, based on the first natural language query and the second natural language query, a third natural language query for the one or more data tables, wherein the first natural language query comprises a first group of words and the second natural language query comprises a second group of words, and generating the third natural language query comprises:
incorporating the first group of words and the second group of words into a sequence of words;
converting the sequence of words into a sequence of symbols by replacing one or more words in the sequence of words with corresponding symbols in a predefined symbol table;
converting the sequence of symbols into a plurality of segment sequences by applying a set of deduction rules to the sequence of symbols, wherein one segment sequence represents a prediction of semantics of the sequence of symbols; and
generating the third natural language query based on one of the plurality of segment sequences.

* * * * *